US011153624B2

(12) United States Patent
Hamon (10) Patent No.: US 11,153,624 B2
(45) Date of Patent: Oct. 19, 2021

(54) METHOD FOR READING A VIDEO STREAM (71) Applicant: VIACCESS, Paris la Defense (FR)

(72) Inventor: Vincent Hamon, Rennes (FR)

(73) Assignee: Viaccess, Paris la Défense (FR)

( * ) Notice: Subject to any disclaimer, the term of this patent is extended or adjusted under 35 U.S.C. 154(b) by 0 days.

(21) Appl. No.: 16/603,862

(22) PCT Filed: Apr. 6, 2018

(86) PCT No.: PCT/FR2018/050858
§ 371 (c)(1),
(2) Date: Oct. 9, 2019

(87) PCT Pub. No.: WO2018/193177
PCT Pub. Date: Oct. 25, 2018

(65) Prior Publication Data
US 2020/0120375 A1    Apr. 16, 2020

(30) Foreign Application Priority Data

Apr. 20, 2017    (FR) ...................................... 1753411

(51) Int. Cl.
*H04N 21/266*    (2011.01)
*H04N 21/647*    (2011.01)
(Continued)

(52) U.S. Cl.
CPC ....... *H04N 21/26606* (2013.01); *G06F 3/013* (2013.01); *H04N 7/1675* (2013.01);
(Continued)

(58) Field of Classification Search
CPC ............. H04N 21/4728; H04N 13/383; H04N 21/64715; H04N 21/835; H04N 21/2541; H04N 21/26606; H04N 7/1675
See application file for complete search history.

(56) References Cited

U.S. PATENT DOCUMENTS 10,063,579 B1 *    8/2018   Machani ................. H04L 67/22
2010/0061553 A1 *   3/2010   Chaum ............ H04N 21/44213
380/200
(Continued)

FOREIGN PATENT DOCUMENTS

EP          3026923      6/2016
WO   WO 2008/134014    11/2008

*Primary Examiner* — Robert J Hance
(74) *Attorney, Agent, or Firm* — Occhiuti & Rohlicek LLP (57) ABSTRACT

This method for reading a video stream comprises a step of comparing a datum characteristic of a behavior of a user with a set of predetermined thresholds, each of which, when it is crossed, characterizes an abnormal behavior of the user, a step of signaling an abnormal behavior if at least one predetermined part of these thresholds is crossed, and, otherwise, the absence of this signaling of an abnormal behavior, and a step of executing a counter-measure which makes it more difficult or impossible to access the set of information items contained in a first baseband video stream on the basis of various proofs of a second baseband video stream composed by a first terminal, this execution step being triggered automatically in response to the signaling of an abnormal behavior and not being triggered in the absence of this signaling of an abnormal behavior.

13 Claims, 2 Drawing Sheets

(51) Int. Cl.
*G06F 3/01* (2006.01)
*H04N 7/167* (2011.01)
*H04N 21/4405* (2011.01)
*H04N 21/254* (2011.01)
*H04N 21/835* (2011.01)

(52) U.S. Cl.
CPC ..... *H04N 21/2541* (2013.01); *H04N 21/4405* (2013.01); *H04N 21/64715* (2013.01); *H04N 21/835* (2013.01)

(56) References Cited

U.S. PATENT DOCUMENTS

| | | |
|---|---|---|
| 2011/0256932 A1 | 10/2011 | Kim et al. |
| 2014/0237609 A1 | 8/2014 | Sharp et al. |
| 2014/0304721 A1 | 10/2014 | Manuel-Devadoss |
| 2016/0267716 A1* | 9/2016 | Patel ................... G09G 5/373 |

* cited by examiner

METHOD FOR READING A VIDEO STREAM

CROSS REFERENCE TO RELATED APPLICATION

This application is the national phase under 35 USC 371 of international application no. PCT/FR2018/050858, filed Apr. 6, 2018, which claims the benefit of the Apr. 20, 2017 priority date of French application no. 1753411.

The invention relates to a method for reading a video stream. The invention also relates to a terminal, an aggregation server and an information recording medium for the implementation of this method.

Here, "compression" refers to the operation consisting in reducing the number of bits used to code one and the same information item. The result of this operation is referred to as a compressed information item. "Decompression" refers to the inverse operation, which makes it possible to obtain, on the basis of the compressed information item, the information item in the form that it had before being compressed, and the result thereof is referred to as the decompressed information item.

"Encryption" refers to the operation consisting in making an information item unintelligible with the aid of a secret information item called an "encryption key" in such a way that this information item can be made intelligible again only with the aid of this key, or of another key corresponding to this key. The result of this operation is referred to as the encrypted information item. "Decryption" refers to the inverse operation, which makes it possible to obtain, with the aid of a secret information item called the "decryption key", on the basis of the encrypted information item, the information item in the form that it had before being encrypted, and the result thereof is referred to as the decrypted information item.

Methods for reading a video stream are known, for example, from patent application WO2008/134014. In these known methods, a first terminal:
collects at least one measurement representative of a behavior of a user of the first terminal and constructs on the basis of said at least one collected measurement at least one datum characteristic of this behavior of this user,
decodes the video stream to obtain a first baseband video stream which is independent of said at least one collected measurement, and then
composes, on the basis of said at least one constructed characteristic datum and of the first baseband video stream, a second baseband video stream which varies as a function of said at least one constructed characteristic datum.

Thereafter, the second video stream is displayed by a display device such as a virtual reality headset. The second video stream depends specifically on the behavior of the user during the reading of the video stream. Typically, the behavior of the user is a position and/or a movement of the user of the terminal in the process of reading the video stream, on which the composition of the second video stream depends.

For example, if the user is pointing their gaze toward the right, the second video stream codes only image fractions situated on the right of the complete image, that is to say the image fractions that the user wishes to look at.

In such a context, copying the second video stream when the terminal is used by a first user to replay it later is of little benefit. Indeed, when the second video stream is replayed, there is very little chance that a second user, who may or may not be the first, reproduces exactly the same behavior as that of the first user. Hence, the video stream replayed is no longer a function of the behavior of the second user, thereby very greatly reducing the benefit of replaying this second video stream. Indeed, in this case, at best, the second user sees exactly the same things as were seen by the first user. On the other hand, he cannot explore the images of the video stream as the first user was able to do, that is to say by modifying their behavior.

The first video stream alone makes it possible to compose the second video stream for all the possible behaviors of the user. However, this first video stream is not directly and simply accessible on an output port of the terminal. On the contrary, access to this first video stream is generally protected by hardware and/or software security measures.

To copy and broadcast, often illicitly, a complete copy of the first video stream, it has been proposed to reconstruct this first video stream on the basis of several proofs of the second video stream that are obtained for various behaviors of the user. This attack is illustrated by the following simplified example. Let us assume that:
when the user is looking to the right, the terminal composes a first proof of the second video stream which contains only the right half of each image of the first video stream, and
when the user is looking to the left, the terminal composes a second proof of the second video stream which contains only the left half of each image of the first video stream.

To obtain a complete copy of the first video stream, the attacker can read the video stream a first time while systematically keeping his head turned toward the right for the whole duration of play of the video stream. He thus obtains a first proof of the second video stream that he records. Next, he reads the same video stream once again but, this time, while systematically keeping his head turned toward the left. He then obtains a second proof of the second video stream that he records. Thereafter, by correctly assembling the images of the first and second proofs of the second video stream, he can reconstruct a complete copy of the first video stream. By "complete copy" of the first video stream is meant a copy on the basis of which it is possible to compose the second video stream as a function of the user's behavior in the same manner as the terminal when reading the original version of the first video stream. When the video stream is transmitted off-line and on demand, to generate the various desired proofs of the second video stream, the attacker can either generate the various proofs one after another by reading the same video stream several times. In all cases, the attacker, or a group of attackers acting in collusion, can also read the same video stream simultaneously on several terminals to generate the various desired proofs of the second video stream in parallel.

In practice, to obtain a complete copy of the first video stream, numerous proofs of the second video stream are generally necessary, which are generated with different behaviors of the user. Under these conditions, to facilitate the generation of these various proofs of the second video stream, it has been proposed to use automatons to carry out the various desired behaviors. For example, when the behavior of the user that causes the second video stream to vary is a movement of this user, an automaton makes it possible to carry out this movement much more precisely than a human being. Moreover, once correctly programmed, there is no longer any need for human intervention to generate the desired proof of the second video stream.

Prior art is also known from:
EP3026923A1,
US2014/304721A1,
US2011/256932A1.

The aim of the invention is to modify a known method for reading a video stream so as to make it more difficult to obtain a complete copy of the first video stream on the basis of the second video stream.

Its subject is therefore a method for reading a video stream in accordance with claim 1.

The claimed method utilizes the fact that in order to construct a complete copy of the first video stream on the basis of several proofs of the second video stream, it is necessary to implement user behaviors that do not correspond to the normal behaviors of a user who is not seeking to obtain a complete copy of the first video stream. Hereinafter, these behaviors which do not correspond to normal behaviors, are dubbed "abnormal". For example, in the example described above, looking constantly and solely to the right or looking constantly and solely to the left, is an abnormal behavior.

The claimed method automatically detects these abnormal behaviors by comparing the data characteristic of the behavior which are constructed by the terminal, with predetermined thresholds. Thereafter, in response to the crossing of one or more of these thresholds, a counter-measure is automatically executed. Its execution makes the construction of a complete copy of the first video stream more difficult. Hence, the claimed method is more resistant in relation to attacks aimed at constructing a complete copy of the first video stream on the basis of proofs of the second video stream.

Moreover, the claimed method is difficult to foil. Indeed, it is very difficult to simulate a normal behavior of a user with the aid, for example, of an automaton.

Finally, the claimed method uses the same characteristic datum as that used to compose the second video stream. Thus, it is not necessary to collect and to construct data specifically dedicated to the triggering of counter-measures.

The embodiments of this reading method can comprise one or more of the characteristics of the dependent claims.

These embodiments of the reading method can exhibit one or more of the following advantages:

The construction of statistical data representing the normal behavior of a user during the reading of the video stream and then the comparing with a first predetermined threshold of a disparity between these statistical data and the data characteristic of the behavior of the user of the terminal makes it possible to detect an abnormal behavior. For example, this makes it possible to detect a behavior which does not take account of the cognitive content of the video stream played. Indeed, the normal behavior of the user generally depends on the cognitive content of the video stream played. Thus, for example, the majority of the users often look at the same part of the image at the same moment. However, to reconstruct a complete copy of the first video stream, it is necessary to resort to behaviors which make it possible to obtain the display of all the parts of each image, therefore including the parts of the image which the users do not normally look at. Thus, looking at parts of the image which are not normally looked at constitutes an exemplary abnormal behavior, whose detection, in isolation or in combination with other abnormal behaviors, leads to triggering the execution of a counter-measure. Moreover, it is very difficult, or indeed impossible, for an automaton to understand the cognitive content of the video stream played and therefore to correctly simulate the normal behavior of a human being. Thus, it seems difficult to foil the detection of abnormal behaviors of this type with the aid of an automaton.

Using, as statistical data, a mapping which indicates for each pixel of an image the probability that a user points their gaze in the direction of this pixel makes it possible to very reliably discriminate an abnormal behavior from a normal behavior.

Using a datum characteristic of the speed or of the acceleration of the movement of the user makes it possible to detect, reliably, in the sense of worthy of confidence, or safe, or with a high probability of success, an abnormal behavior. Indeed, the possible movements of a human being are limited by the physiological limits of the human body. The possible movements of an automaton do not exhibit the same limits. Thus, if it is detected that a characteristic of the speed or of the acceleration of the movement exceeds the normal physiological capabilities of a human being, it is practically certain that the movement is one carried out by an automaton and therefore that the behavior is an abnormal one.

The use of a supervised-learning classifier simplifies the discrimination between an abnormal behavior and a normal behavior.

The calculation of a global score which is a function at one and the same time of the results of the classifier, of the data characteristic of the speed or of the acceleration of the movement and of the statistical data, makes it possible to improve the reliability of the detection of an abnormal behavior and therefore to trigger the counter-measures in a more appropriate manner.

The subject of the invention is also a terminal for reading a video stream for the implementation of the claimed method.

The subject of the invention is also a data aggregation server for the implementation of the claimed method.

Finally, the subject of the invention is also an information recording medium comprising instructions for the implementation of the claimed method, when these instructions are executed by a microprocessor.

The invention will be better understood on reading the description which follows, given solely by way of nonlimiting example and while referring to the drawings in which.

In these figures, the same references are used to designate the same elements. Hereinafter in this description, the characteristics and functions which are well known to the person skilled in the art are not described in detail.

Figure 1:
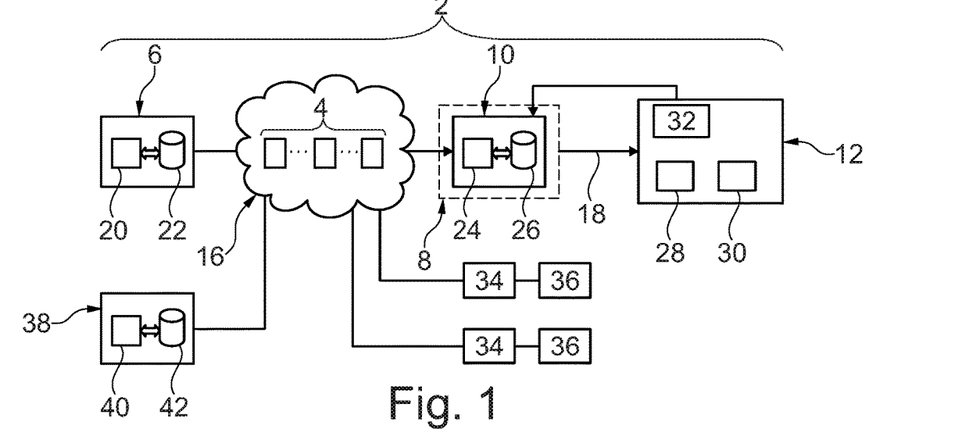
FIG. 1 is a schematic illustration of the architecture of a system for generating and reading a compressed and encrypted video stream.

FIG. 1 represents a system 2 for generating and reading an encrypted and compressed video stream 4. The system 2 comprises:

a generator 6 of the video stream 4, a terminal 8 equipped with a reader 10 of the video stream 4, and a device 12 for displaying the video stream 4 read by the reader 10.

The video stream 4 codes a temporal and ordered succession of complete images. On the basis of the video stream 4, the reader 10:
obtains a first decrypted and decompressed baseband video stream, and then
composes, on the basis of this first video stream, a second baseband video stream comprising so-called "composed" images intended to be displayed one after another on a screen at a given frequency conventionally called the "refresh frequency". In this embodiment, the video stream 4 is an immersive video. Thus, typically, the video stream 4 is intended to be displayed by a virtual reality display device.

The video stream 4 is therefore a video in which each coded complete image simultaneously contains coded views of what surrounds the camera in several different directions. For example, each complete image contains views taken from all the directions contained inside a viewing cone whose vertex coincides with the optical center of the objective of the camera. Generally, the angle $\alpha$ at the vertex of this viewing cone is greater than the viewing angle of a human being if the latter were situated at the same location as the camera. Because of this, each image of the video stream comprises more views than can be perceived, in one go, by a stationary human being situated at the location of the camera. Typically, the angle $\alpha$ is therefore strictly greater than 70° or 80° and, generally, greater than 100° or 180° or 260°. In the case where the viewing cone does not have a circular base, that is to say that it is not a cone of revolution, the angle $\alpha$ is defined as being equal to the vertex angle of the smallest cone of revolution which fully contains this viewing cone. By smallest cone of revolution is meant the cone of revolution which has the smallest vertex angle and whose vertex coincides with the vertex of the viewing cone.

When the angle $\alpha$ is equal to 180°, the image is often called a "hemispherical image". The angle $\alpha$ can also be equal to 360°. In this case, each image contains the views taken from all directions in space. One then often speaks of 360° images or of omnidirectional images.

The camera used to film and record an immersive video comprises for example several objectives simultaneously pointed in different directions and/or objectives with very large aperture angles, that is to say objectives whose aperture angle is greater than 100° or 160° or 180°.

The generator 6 is hooked up to the terminal 8, for example, by way of an information transmission network 16 such as the Internet network. The generator 6 can be a broadcasting network head or a video server.

The generator 6 comprises a programmable electronic microprocessor 20 hooked up to a memory 22. The microprocessor 20 is capable of executing the instructions recorded in the memory 22. Here, the memory 22 comprises the instructions necessary for implementing the method of FIG. 4.

The terminal 8 commands the device 12 so as to display the video stream that it reads. In this embodiment, the device 12 is considered to be an element outside the terminal 8.

The reader 10 decrypts and decompresses the video stream 4 and then composes a baseband video stream 18 on the basis of the decrypted and decompressed video stream.

Typically, a baseband video stream consists mainly of blocks of successive bits which each code the color of a respective pixel. It is the position of the block of bits inside the video stream 18 which codes the position of the corresponding pixel. For example, the video stream 18 complies with the HDMI ("High Definition Multimedia Interface") format or the like. If necessary, the video stream 18 can be encrypted in compliance with the HDCP ("High-Bandwidth Digital Content Protection") norm. The link between the reader 10 and the device 12 is a short-distance link, that is to say a distance of generally less than 30 m or 20 m or 10 m. Hereinafter, the video stream 18 is termed plaintext since it no longer needs to be decrypted by the reader 10 in order to be displayable, by the device 12, in a directly intelligible form.

The reader 10 comprises a programmable electronic microprocessor 24 hooked up to a memory 26. The microprocessor 24 is capable of executing the instructions recorded in the memory 26. Here, the memory 26 comprises instructions necessary for the implementation of the methods of FIGS. 5 and 6.

Here, the device 12 is any head-mounted display HDM or virtual reality headset making it possible to obtain a stereoscopic display. To this effect, the device 12 comprises in particular two screens 28 and 30 placed, respectively, facing the right and left eyes of the user. The device 12 also comprises a set 32 of sensors which are capable of measuring one or more physical quantities representative of a behavior of the user. This exemplary embodiment is described hereinafter in the particular case where the behavior of the user is a position and/or a movement of the user that is wearing this device 12. Here, by way of example, the behavior of the user that makes it possible to cause the video stream to vary is the direction in which the user's gaze is pointing. The sensors of the set 32 therefore in particular make it possible to construct at least one datum characteristic of the direction in which the user's gaze is pointing. For example, the set 32 comprises to this effect sensors which measure the movement of the user's head and/or of the user's pupils. Here, this set 32 accordingly comprises a three-axis accelerometer able to measure the acceleration of the device 12 in three mutually orthogonal directions denoted X, Y and Z respectively. The set 32 is hooked up to the reader 10.

In this embodiment, the system 2 comprises several other terminals 34 each capable of reading the video stream 4 in the same manner as the terminal 8. To this effect, each of the terminals 34 is hooked up to the network 16 and associated with its own display device 36. To simplify the description, it is considered here that these terminals 34 and devices 36 are identical, respectively, to the terminal 8 and to the device 12. To simplify FIG. 1, only two terminals 34 and two devices 36 have been represented. However, in practice, the number of terminals 34 and devices 36 is a lot higher. For example, the number of terminals 34 is greater than ten, a hundred, a thousand or 10 000.

Finally, the system comprises an aggregation server 38 capable of exchanging information both with the terminal 8 and the other terminals 34. To this effect, it is hooked up to the network 16. The server 38 comprises a programmable electronic microprocessor 40 hooked up to a memory 42. The microprocessor 40 is capable of executing the instructions recorded in the memory 42. Here, the memory 42 comprises instructions necessary for implementing the method of FIGS. 5 and 6.

Hereinafter, the embodiment of the system 2 is described in the particular case where:
the video stream 4 is coded in compliance with the H.265 standard, also known by the term HEVC ("High Efficiency Video Coding"),
the transport layer complies with the ISOBMFF ("ISO Base Media File Format") standard, and
the encryption/decryption of the video stream complies with the CENC ("Common Encryption Scheme") standard.

For more information on the H.265 standard, the reader can refer to the documents ISO/CEI 23008-2 and UIT-H.265 published in April 2015 or their subsequent versions. For more information on the ISOBMFF standard, the reader can refer to the document ISO/CEI 14496-12 published in December 2015. For more information on the CENC standard, the reader can refer to the document ISO/CEI 23001-7 second edition or their subsequent versions.

These standards being known to the person skilled in the art, the operating principles and the various possibilities of implementation that these standards offer are not described here in detail. Only the particular way of using and of implementing these standards to generate and read the video stream 4 is described here. The terminology used in this description is the same as that defined in these standards.

Figure 2:
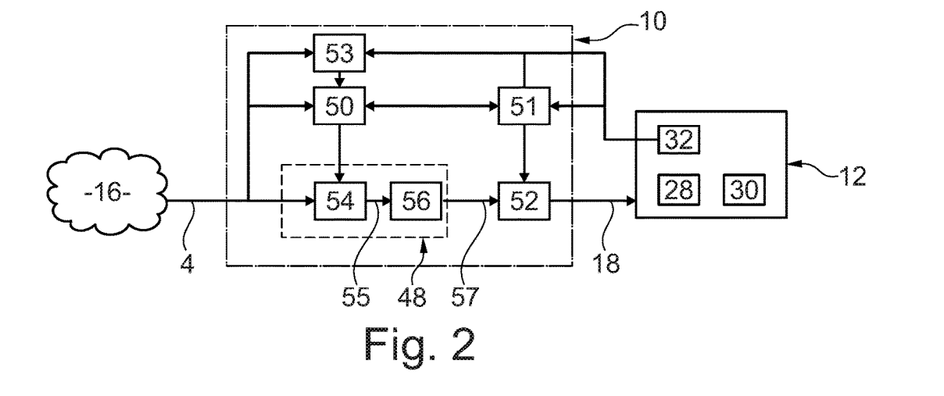
FIG. 2 is a schematic illustration of the architecture of a reader of the video stream implemented in the system of FIG. 1.

FIG. 2 represents in the form of functional modules the architecture of the reader 10. The various modules represented in this figure can each be implemented either in software form with the aid of the microprocessor 24 and of the memory 26 or in the form of an additional specific hardware component. The reader 10 comprises:

a module 48 for decrypting and decompressing the video stream 4, a DRM ("Digital Right Management") agent 50 able to acquire, verify, manage and store secret information as the keys and the access rights required for the decryption of the received video stream 4, a positioner 51 which establishes the coordinates of a point of interest as a function of the measurements of the sensors of the set 32, a composer 52 responsible for constructing the video stream 18 as a function of the coordinates established by the positioner 51 and of the images of the decrypted and decompressed video stream, and an analyzer 53 of behaviors able to detect an abnormal behavior of the user and, in response, to trigger the execution of a counter-measure which makes it more difficult to obtain a complete copy of the decrypted and decompressed video stream on the basis of the video stream 18.

The module 48 comprises:
a decryption sub-module 54 which decrypts the video stream 4 with the aid of the decryption keys which are transmitted to it by the DRM agent 50 so as to obtain a decrypted video stream 55, and a codec 56 (coder-decoder) which decompresses the video stream 55 to obtain a decrypted and decompressed video stream 57, also termed plaintext and baseband.

The composer 52 is typically implemented in a dedicated electronic graphical processing unit better known by the acronym GPU ("Graphical Processor Unit").

Here, the analyzer 53 is hooked up at one and the same time to the set 32 of sensors and to the network 16, so as to acquire measurements representative or data characteristic both of the behavior of the user of the terminal 10 and of the behaviors of the users of the other terminals 34. The analyzer 53 is also hooked up to the DRM agent 50 and to the positioner 51 so as to trigger, if necessary, the execution by these components of a counter-measure.

The customary functioning of the various components of the reader 10 is known and described in the standards cited hereinabove. Thus, hereinafter, only the functioning of these components which is specific to the reading of the video stream 4 is described in detail. Here, this functioning is described with reference to FIGS. 5 and 6.

Figure 3:
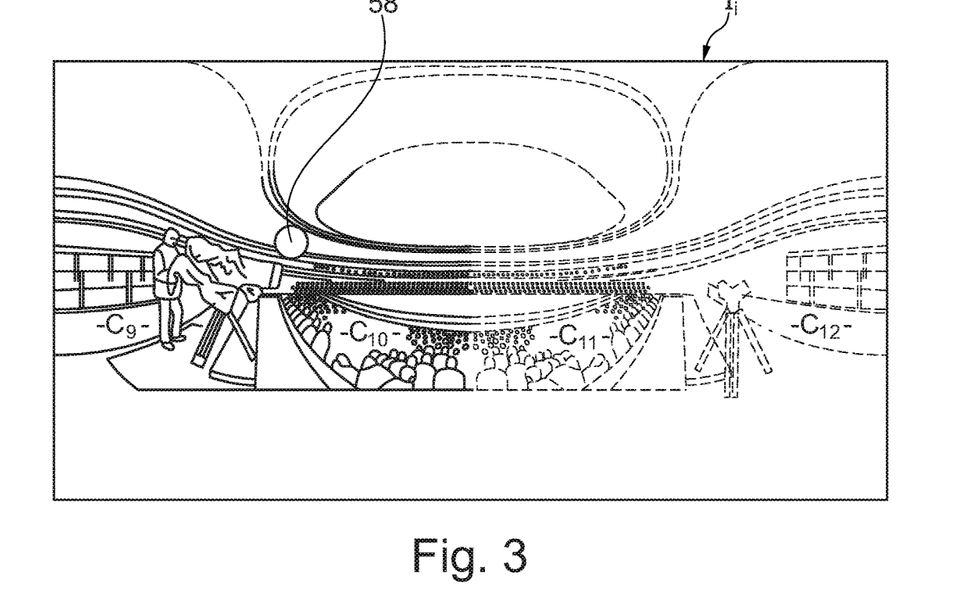
FIG. 3 is a schematic illustration of a complete image of the video stream.

FIG. 3 represents a complete image $I_t$ of the video stream 57. The point 58 represented on this image $I_t$ corresponds to the point toward which the user is pointing their gaze. This point 58 is called the "point of interest" hereinafter.

Figure 4:
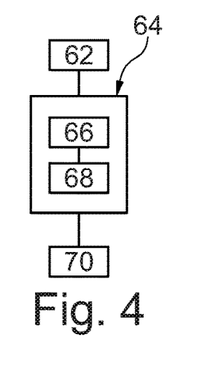
FIG. 4 is a flowchart of a method for generating the video stream implemented in the system of FIG. 1.

The functioning of the generator 6 is now described with reference to the method of FIG. 4.

During a step 62, the generator 6 receives an initial video stream to be compressed and to be encrypted. For example, accordingly, the generator 6 is hooked up to a camera or to an information recording medium on which the initial video stream is recorded, or hooked up to a network on which it is transmitted to it. At this instant, the received video stream contains on its own all the information necessary to be displayed on a screen in a form directly intelligible by a human being. In particular, to obtain this display, it is not necessary to combine the plaintext images with a secret information item such as a decryption key.

During a step 64, the generator 6 cuts the video stream into closed groups of images. Thereafter, for each closed group of images, it executes the following operations:

an operation 66 of compression of the closed group of images, and then an operation 68 of encryption with an encryption key $K_C$ of the compressed group of images so as to obtain a compressed and encrypted group of images.

Finally, during a step 70, the compressed and encrypted groups of images are assembled together to form the video stream 4.

On completion of this step 70, the video stream 4 is either transmitted in tandem with its generation to the terminal 8 and to the other terminals 34 through the network 16, or recorded in a file in the memory 22. The first mode of transmission corresponds to a transmission known by the term broadcasting, in which the transmission of the video stream 4 starts before all the groups of images of this video stream have been compressed and encrypted. For example, such a first mode of transmission is more precisely a continuous or in-transit transmission ("streaming" in English), in the case of a mode of point-to-point broadcasting over the Internet. Conversely, the second mode of transmission corresponds to a transmission known by the term "downloading" in which the transmission of the file to the terminal 8 and the other terminals 34 can begin only after all the images of the initial video stream have been acquired, compressed and encrypted.

Figure 5:
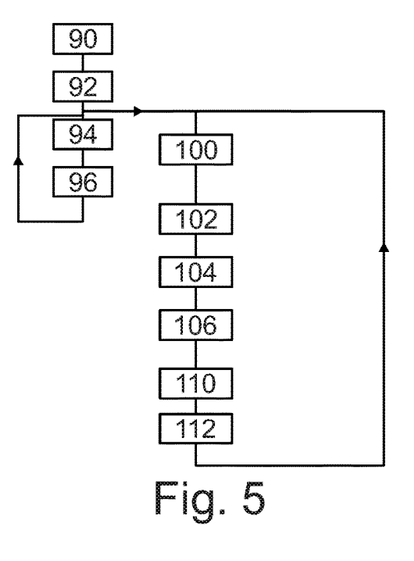
FIGS. 5 and 6 are flowcharts of a method for reading the video stream implemented in the system of FIG. 1.

The functioning of the terminal 8 will now be described with reference to the method of FIG. 5.

Initially, during a step 90, the DRM agent 50 acquires a decryption key $K_D$ necessary for decrypting the compressed and encrypted groups of images of the video stream 4.

During a step 92, the reader 10 receives the video stream 4 transmitted continuously or downloaded through the network 16.

During a step 94, the sensors of the set 32 measure one or more physical quantities representative of the behavior of the user of the terminal 12 and the reader 10 collects these measurements. Here, these measurements are in particular collected by the positioner 51 and the analyzer 53.

In response, during a step 96, the positioner 51 constructs the coordinates, in the plane of the images, of the point of interest 58. Accordingly, these coordinates are constructed on the basis of the measurements collected and, for example, on the basis of the measurements of the three-axis accelerometer. The coordinates of the point 58 are data characteristic of the behavior of the user.

For the whole duration of reading of the video stream 4, steps 94 and 96 are repeated in a loop. For example, these steps are repeated with a frequency greater than the frequency of refreshing of the images on the screens 28 and 30. Thus, the positioner 51 permanently provides up-to-date coordinates of the point 58.

In parallel, during a step 100, before the reading of each group of images, the DRM agent 50 determines whether it is authorized to decrypt this group of images. The DRM agent 50 determines whether it is authorized to decrypt without restriction the group of images for example on the basis of the access rights which were provided to it previously.

In the case where the DRM agent 50 is authorized to decrypt the group of images, it then undertakes a step 102 during which the DRM agent 50 provides the decryption key $K_D$ to the decryption sub-module 54.

In response, during a step 104, the sub-module 54 decrypts, with the aid of the key $K_D$ provided, the compressed and encrypted group of images to obtain a compressed and decrypted group of images.

Thereafter, during a step 106, the codec 56 decompresses the compressed group of images that was obtained on completion of step 104. The codec 56 then obtains a decompressed and decrypted group of images.

Steps 100 to 106 are repeated for each group of images of the video stream 4. The set of groups of decompressed and decrypted images forms the video stream 57 transmitted to the composer 52.

Thereafter, during a step 110, the composer 52 composes the video stream 18 on the basis of the video stream 57 and of the coordinates of the point of interest 58 which are transmitted by the positioner 51. More precisely, in this embodiment, on the basis of each complete image $I_i$ of the video stream 57, it composes two image fractions, respectively, for the user's right and left eyes. To this effect, it uses the coordinates of the point 58 which are transmitted to it by the positioner 51 and the known position as well as the known dimensions of the screens 28 and 30. Typically, these two image fractions are each four or ten times smaller than the complete image $I_i$ contained in the video stream 57. Moreover, these image fractions are centered on the point 58. Thus, the video stream 18 contains only a fraction of each complete image of the video stream 57.

Finally, during a step 112, the composer 52 transmits, by way of the video stream 18, the image fractions composed, and the device 12 displays them on the screens 28 and 30.

Steps 110 and 112 are repeated for each complete image of the group of images currently undergoing processing of the video stream 57.

As described in the introduction to this patent application, to reconstruct the complete image $I_i$, a known attack consists in assembling the fractions of the image $I_i$ which are contained in various proofs of the video stream 18. These various proofs of the video stream 18 are obtained with different coordinates of the point 58.

In the case where, during step 100, the DRM agent 50 establishes that it is not authorized to decrypt the group of images, it inhibits step 102. Consequently, and according to the implementation of the system, steps 104 and 106, and then, for each complete image of the group of images currently undergoing processing, steps 110 and 112, are each either also inhibited or implemented with an incorrect input arising from an encrypted group of images. They thus culminate in the interruption of the display of the images of the group of complete images currently undergoing processing, or in their display in an unintelligible form, that is to say in the prohibiting of access to these images.

Figure 6:
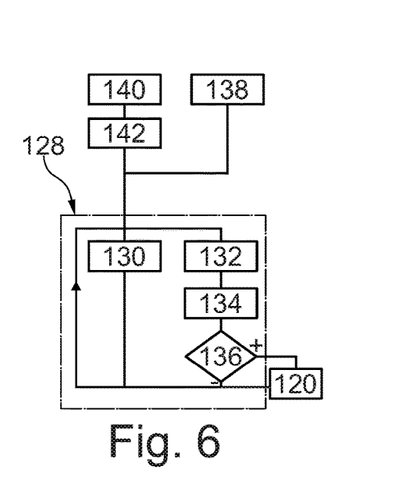

The functioning of the analyzer 53 in order to detect an abnormal behavior of the user will now be described with reference to the method of FIG. 6.

The analyzer 53 permanently executes a phase 128 of diagnosis of the behaviors of the user to detect abnormal behaviors.

Accordingly, during a step 130, in parallel with step 110 for each complete image of the group of images currently undergoing processing of the stream 57, the analyzer 53 collects the measurements of the sensors of the set 32 as well as the coordinates of the point 58 which are established by the positioner 51. Hereinafter, the measurements collected and the coordinates collected of the point 58 are collectively called "collected data".

During this step 130, the reader 10 also transmits the collected data to the server 38 by way of the network 16. More precisely, the collected data are each associated with an identifier of a corresponding image of the video stream. The corresponding image is the image composed on the basis of these data collected during step 110. For example, the collected data are time-stamped, that is to say associated with a date which makes it possible to tag in the video stream played, the image processed by the composer at the instant of collection of these collected data.

In parallel, during a step 132, the analyzer 53 constructs, on the basis of the collected data, one or more data characteristic of the behavior of the user in addition to the datum already constructed by the positioner 51.

Thereafter, during a step 134, the analyzer 53 uses various techniques to detect an abnormal behavior on the basis of the characteristic data constructed. During this step 134, each time that an abnormal behavior is detected, it is signaled. For example, in this embodiment, all the detection techniques described hereinbelow are concomitantly implemented by the analyzer 53 to tend to limit the number of false positives. A false positive corresponds to the case where an abnormal behavior is detected, whilst the behavior of the user is normal. The execution of a counter-measure is then triggered, and the user thus inopportunely penalized in their experience of the service, this having to be avoided as far as possible. The various detection techniques described here are classed into three distinct families:

a first family which groups together so-called "initial-detection" techniques which uses directly and only the data collected by the terminal 8 via the sensors of the set 32 of the device 12, a second family of so-called "classification" techniques which use a classifier to discriminate an abnormal behavior from a normal behavior, and a third family of so-called "consolidation" techniques which use data collected by the other terminals 34.

Hereinbelow examples of techniques in these three families are described.

Initial-Detection Techniques:

A first initial-detection technique consists in constructing, on the basis of the collected data, a characteristic datum ID1 which characterizes a physical property of the speed or of the acceleration measured of a movement of the user. This datum ID1 is constructed on the basis of the data collected during a predetermined time interval T1. Typically, the interval T1 lies between 3 s and 30 s. For example, the datum ID1 is the average acceleration, constructed on the basis of the measurements of the three-axis accelerometer, of the movement of the device 12 during the interval T1. Thereafter the analyzer 53 compares the datum ID1 with a predetermined threshold $S_1$. This threshold $S_1$ is low, that is to say less than 0.1 m/s² or 0.05 m/s². Thereafter, according to this first initial-detection technique, the analyzer 53 detects an abnormal behavior if the characteristic datum ID1 remains less than this threshold $S_1$ for a predetermined duration of greater than 15 s or 1 min or 5 min. Indeed, it is very difficult for a human being to remain perfectly stationary or to move at a perfectly constant speed for such a duration. Thus, a movement at perfectly constant speed, or perfect stationarity, for this predetermined duration, is an abnormal behavior.

The various predetermined thresholds described here are calibrated beforehand in such a way as to be able to discriminate a normal behavior from an abnormal behavior. Accordingly, use is typically made of suites of values of the characteristic data constructed when the terminal is used by a human being and when it is commanded by an automaton. The comparison of these various suites of values easily allows a person skilled in the art to correctly calibrate the predetermined thresholds.

According to a second initial-detection technique, the datum ID1 is constructed as described hereinabove. Thereafter, this datum ID1 is compared with a predetermined threshold $S_2$. This threshold $S_2$ is high. For example, the threshold $S_2$ is greater than 20 m/s$^2$ or 50 m/s$^2$. Thereafter, the analyzer 53 detects an abnormal behavior if the datum ID1 remains greater than this threshold $S_2$ for a predetermined duration of greater than 1 s or 2 s or 5 s. Indeed, on account of the physiological limitations of a human body, the movement of the head of a human being cannot cross this threshold. Conversely, an automaton can do so without difficulty. Thus, the crossing of this threshold $S_2$ by the datum ID1 is an abnormal behavior.

According to a third initial-detection technique, a characteristic datum ID2 is constructed by the analyzer 53. This characteristic datum ID2 is the standard deviation or the variance of the accelerations measured by the three-axis accelerometer for a predetermined duration. The analyzer 53 thereafter compares the datum ID2 with a predetermined threshold $S_3$. The threshold $S_3$ is chosen small so as to discriminate the normal movements from abnormal movements. Indeed, the movements of a human being are never perfectly regular and constant. They therefore almost never correspond to a perfectly constant acceleration. For example, the value of the threshold $S_3$ is less than 0.1 m/s$^{-2}$ or less than 0.05 m/s$^{-2}$. If the value of the datum ID2 is less than the threshold $S_3$, the analyzer 53 signals an abnormal behavior.

According to a fourth initial-detection technique, the analyzer 53 constructs a characteristic datum ID3 on the basis of the acceleration measurements collected over a fairly long time period. The datum ID3 characterizes the periodicity of the user's movements during this time period. This time period is greater than 5 min or 10 min or 1 h. Thereafter, the value of the datum ID3 is compared with a predetermined threshold $S_4$. If the threshold $S_4$ is crossed, the analyzer 53 signals an abnormal behavior. Indeed, a regularly repeated movement is generally not a normal movement. For example, the analyzer 53 constructs the spectral density of the three-axis accelerometer's measurements measured during this time period. Thereafter, the analyzer 53 compares the height of the highest peak of this spectral density with the threshold $S_4$. If the threshold $S_4$ is crossed, the analyzer 53 signals an abnormal behavior.

Classification Techniques:

According to a first classification technique, the analyzer 53 implements and executes a supervised-learning classifier capable of automatically comparing a suite of constructed characteristic data with predetermined thresholds so as to class the current behavior of the user, either in the class of normal behaviors, or in the class of abnormal behaviors. The predetermined thresholds used by this classifier are obtained by training it, during a prior phase 138 of supervised learning on prerecorded suites of characteristic data for which the classification between abnormal behavior and normal behavior is known. These suites of characteristic data therefore comprise at least:

a suite of characteristic data constructed when the collected data are generated by a human being in the process of using a terminal such as the terminal 8, and a suite of characteristic data constructed when the collected data are generated by a human being or by an automaton so as to contribute to obtaining a complete copy of a video stream 57.

Such classifiers are well known to the person skilled in the art and will not therefore be described in greater detail here. For example, the classifier implemented by the analyzer 53 is a linear classifier such as a naive Baysian classifier or a support vector machine or SVM or a neural network.

Preferably, to limit the number of data processed by the classifier, the latter does not directly process the collected data but characteristic data constructed by the analyzer 53 on the basis of the collected measurements. For example, the characteristic data used by the classifier are the following:

the averages of the accelerations measured in each of the directions X, Y and Z, for a predetermined duration, the variances of the accelerations measured in each of the directions X, Y and Z for a predetermined duration, the energy of the signal of the acceleration measured on each axis X, Y and Z for a predetermined duration, the entropy of the acceleration measured in each of the directions X, Y and Z for a predetermined duration, and the correlation coefficients between the measurements collected for each of the directions X, Y and Z.

Quite obviously, in this case, the supervised learning phase is likewise carried out by using the same characteristic data.

Consolidation Techniques:

The consolidation techniques require the implementation of a step 140, prior to step 134, during which the other terminals 34 read the same video stream 4. For example, to this effect, the method described with reference to FIGS. 5 to 6 is executed by each of the terminals 34. Consequently, the server 38 has at its disposal a database associating with each image of the video stream 57 the data collected by these other terminals 34. With the help of this database, during a step 142, the server 38 constructs statistical data with which the characteristic data constructed locally by the terminal 8 can be compared to detect an abnormal behavior.

According to a first consolidation technique, on the basis of the collected data via the other terminals 34, the server 38 establishes, during a step 142, first statistical data. Here, these first statistical data are thresholds that the values of the collected data have very little chance of crossing if the behavior of the user is normal. By "very little chance" is meant here a probability of less than one chance in a hundred or in a thousand or in 10 000. Thereafter, the server 38 transmits these thresholds to the terminal 8 before or during the playing of the video stream 4 by the terminal 8. In response, the analyzer 53 compares with these received thresholds the data collected locally while the same fraction of the video stream is read. If one of these thresholds is crossed, the analyzer 53 then signals an abnormal behavior. The transmission of the values thus established of these thresholds to the terminal 8 before the latter begins to read the video stream 4 is possible only in the case where the video stream 4 is a video stream which is prerecorded and transmitted on demand. Conversely, the transmission of the values established of these thresholds during the playing of the video stream 4 by the terminal 8 is possible both for a video stream which is prerecorded and transmitted on demand and for a video stream which is broadcast live.

For example, on the basis of the acceleration collected and taken into account, by each of the terminals 34, for the composition of the fractions of images of the video stream 18 on the basis of one and the same complete image of the video stream 57, the server 38 constructs the statistical distribution of this collected acceleration. Thereafter, it deduces therefrom the values of thresholds $S_{min}$ and $S_{max}$ between which 99% of the collected accelerations lie. These thresholds $S_{min}$ and $S_{max}$ are then transmitted to the terminal 8. The terminal 8 then compares with the thresholds $S_{min}$ and $S_{max}$ the acceleration collected locally during the reading of this fraction of the video stream 4. If one of the thresholds $S_{min}$ and $S_{max}$ is crossed by the locally collected acceleration, the analyzer signals an abnormal behavior. This first consolidation technique makes it possible to dynamically adjust the value of the predetermined thresholds as a function of users' behaviors measured by the terminals 34.

According to a second consolidation technique, the server 38 constructs on the basis of the data collected via the terminals 34, second statistical data necessary for the implementation of an anomaly detection algorithm. This family of algorithm is known by the term "anomaly detection" or "outlier detection". Thereafter, the second statistical data thus constructed are transmitted to the analyzer 53 of the terminal 8. The analyzer 53 then compares the locally constructed characteristic data with the second statistical data received to detect an abnormal behavior. More precisely, during this comparison step, a disparity between the local characteristic data and the second statistical data is compared with a predetermined threshold. Thereafter, it is the crossing of this threshold predetermined by this disparity which triggers the detection of an abnormal behavior.

By way of illustration, the anomaly detection algorithm is an algorithm of the family known by the expression "cluster-based Local Outlier" such as the LOF ("Local Outlier Factor") or FindCBLOF algorithm.

Figure 7:
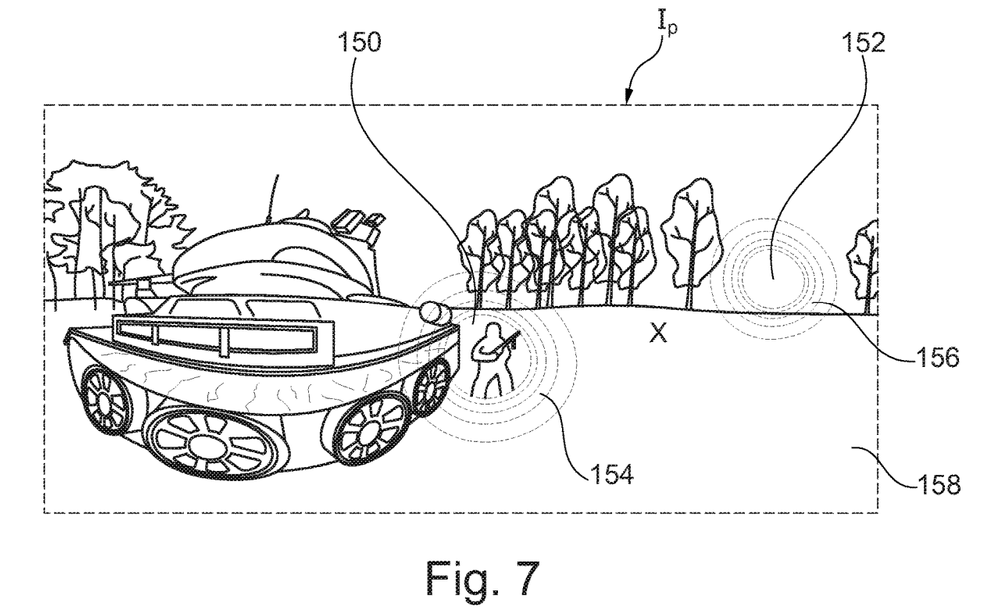
FIG. 7 is a schematic illustration of statistical data implemented in the system of FIG. 1.

FIG. 7 represents an example of second statistical data constructed by the server 38 on the basis of the data collected via the terminals 34. In this example, the collected data are the coordinates of the point 58 which are associated with a particular image $I_P$ of the video stream 4. FIG. 7 represents this image $I_P$. The second statistical data constructed take the form here of a mapping which associates with each pixel of the image $I_P$ a probability that the direction of the user's gaze is pointing toward this pixel. For example, this probability is the number of times that, when this image $I_P$ is read, the user points their gaze toward this pixel. Stated otherwise, for each pixel of the image $I_P$, the server 38 enumerates the number of times that the coordinates collected of the point 58 correspond to this pixel. The server 38 thus constructs a mapping associating with each pixel a probability that this pixel is looked at by the user. This mapping makes it possible, for example, to identify the zones of the image $I_P$ that are most looked at by the users. By way of illustration, in FIG. 7, two zones 150, 152 that are most looked at by the users are surrounded. This mapping also makes it possible to identify the zones of the image $I_P$ that are less often looked at and zones of the image $I_P$ which are not or almost not looked at by the users. FIG. 7 represents two zones 154 and 156 that are looked at less often. Here, these two zones 154 and 156 surround, respectively, the zones 150 and 152. Here, the zone 158 of the image $I_P$, situated outside of the zones 150 to 156, constitutes a zone which is not or almost not looked at by the users.

Thereafter, this mapping associated with the image $I_P$ is transmitted to the analyzer 53. When the image $I_P$ is processed by the composer 52, the analyzer 53 collects the coordinates of the point 58 that were established by the positioner 51 at that instant. These collected coordinates are thereafter compared with the mapping received. Here, this comparison consists in calculating the shortest distance which separates the coordinates of the point 58 from the zones most looked at. If this distance exceeds a predetermined threshold, an abnormal behavior is detected. In the converse case, no abnormal behavior is detected. For example, the LOF algorithm is implemented to execute this comparison.

Advantageously, the analyzer 53 can also implement a filter to limit untimely detections of abnormal behaviors. For example, an abnormal behavior is detected only if the calculated distance exceeds the predetermined threshold for P consecutive images or ten times in fewer than M minutes. For example, P lies between 4 and 20 and M lies between 3 and 30 min. Here, P is equal to 5 and M is equal to 5 min.

After step 134, the analyzer 53 undertakes a step 136 during which it executes a decision algorithm. The execution of this algorithm makes it possible to decide whether, in response to the results of the detections implemented, the execution of a counter-measure should be triggered and, if so, which. Advantageously, to make this decision, the analyzer 53 takes account of the results of the detections implemented inside a sliding time window $\Delta T$. It takes account in particular of the abnormal behaviors detected and of the detection techniques used to detect each abnormal behavior. The sliding window $\Delta T$ immediately precedes the triggering of step 136 in progress. For example, the window $\Delta T$ has a duration of greater than 1 min or 5 min or 15 min and of less than 1 h.

By way of illustration, during step 136, the analyzer 53 calculates a global score on the basis of the number of abnormal behaviors detected during the window $\Delta T$. When calculating this score, a weighting coefficient can be applied to the number of abnormal behaviors detected by a particular detection technique so as to accord more importance to certain detection techniques relative to others. For example, these weighting coefficients are used here to accord more importance to the consolidation techniques described hereinabove relative to the initial-detection techniques and to the classification techniques.

Thereafter, the analyzer 53 compares the calculated global score with at least one predetermined threshold. If this threshold is crossed, the analyzer 53 triggers the implementation of a counter-measure execution step 120. To this effect, according to the nature of a counter-measure to be executed, the analyzer 53 dispatches a triggering instruction to the module in charge of this execution, or triggers it itself.

During step 120, the reader 10 executes a counter-measure the effect of which is to make it more difficult to obtain a complete copy of the video stream 57 on the basis of various proofs of the video stream 18.

Numerous counter-measures can be executed to achieve this result.

For example, a first counter-measure consists in commanding the display device 12 so that it plays a CAPTCHA™, that is to say for example that it displays the CAPTCHA™ above the fractions of images of the video stream 18 and, simultaneously, in interrupting the generation of the video stream 57. In another example, the counter-measure consists firstly in only commanding the device 12 so that it plays a CAPTCHA™ above the fractions of images of the video stream 18, and then, only if a correct response of the user to the CAPTCHA™ is not acquired before the expiry of a predetermined lag counting from the start of the playing of the CAPTCHA™, in interrupting the generation of the video stream 57. For example, to interrupt the generation of the video stream 57, the agent 50 interrupts the transmission of the decryption key $K_D$ to the decryption sub-module 54. If the user's acquired response to the CAPTCHA™ played is correct, then, the display device 12 is commanded so that it interrupts the playing of the CAPTCHA™, and the agent 50 authorizes the resumption of the generation of the video stream 57 by the module 48 by resuming transmission of the key $K_D$ to the sub-module 54. In the absence of response to this CAPTCHA™ or in case of incorrect response, the agent 50 maintains the interruption of the generation of the video stream 57. The term CAPTCHA™ is a trademark of Carnegie-Mellon university. It is a backronym which is pronounced "capture" in English, and is presumed to be composed of the initials of Completely Automated Public Turing test to tell Computers and Humans Apart, i.e. a completely automatic public Turing test aimed at differentiating humans from computers. It refers to a challenge-response test used in computing, to enable a computer to ensure that a response to a challenge is not generated by a computer. A CAPTCHA™ is typically a question or a riddle played by the device 12 and which a human being can easily answer but which, on the contrary, is very difficult for an automaton to answer correctly. Thus, this counter-measure makes it more difficult to implement an attack since it makes it difficult, or indeed impossible, to completely automate this attack.

There exists a very large variety of possible CAPTCHA™. For example, the CAPTCHA™ may be an image containing a combination of partly masked and/or deformed characters so as to make it very difficult for an automaton to recognize these characters automatically. The correct response to this CAPTCHA™ is then the word formed by the combination of displayed characters. In another example, the CAPTCHA™ is an audio or video message to which the user must respond correctly in order to authorize resumption of the generation of the video stream 57. For example, advantageously, the CAPTCHA™ is an audio or video message which asks the user to adopt a particular behavior such as turn their head to the left. The response to such a CAPTCHA™ is then acquired by the terminal 8 on the basis of the measurements collected via the set 32 of sensors.

A second counter-measure consists in only interrupting as hereinabove, in a temporary or permanent manner, the generation of the video stream 57.

The third counter-measure consists in degrading the quality of the video stream 57 or 18. For example, the analyzer 53 commands the module 50, the module 48 and/or the composer 52 in such a way as to decrease the spatial resolution or to degrade the colors of the coded images or to decrease the frequency of sampling of the coded sounds. The degradations applied to the video stream 57 or 18 are such that, on the basis of the degraded video stream 57 or 18 and without additional information, it is not possible to reconstruct the undegraded video stream 57 or 18.

The fourth counter-measure is the transmission, by the terminal 8, of a command to the generator 6. In response to this command, the generator 6 interrupts for example the transmission of the video stream 4 to the terminal 8 or transmits to the terminal 8 only a degraded video stream 4, for example, as described in the previous paragraph. In another example, the generator 6 interrupts the transmission, to the terminal 8, of the access rights to the video stream 4, or transmits to it only the access rights to a degraded video stream 4.

A fifth counter-measure consists in degrading the coordinates of the point 58 that were established by the positioner 51. For example, the analyzer 53 commands the positioner 51 or the composer 52 so that it holds these coordinates constant during a predetermined time interval, doing so irrespective of the movements carried out by the user during the same time interval. This predetermined time interval may or may not be limited to the duration of the reading in progress of the video stream 4. In this case, the video stream 18 is no longer correlated, during this time interval, with the user's behavior, thereby making it very difficult, or indeed impossible, to move the point 58 to the desired spot inside the image. The degradation of the coordinates of the point 58 can also consist in modifying these coordinates in a random manner. It is also possible to apply a predetermined degradation of the coordinates of the point 58. For example, the coordinates of the point 58 are modified in such a way that the point 58 follows a predetermined path independent of the behavior of the user. In another example, the coordinates of the point 58 are systematically modified so as to prohibit the positioning of the point 58 inside certain predetermined zones of the complete images of the video stream 57. This prevents the composer 52 from composing a video stream 18 containing information in these predetermined zones of images.

On completion of step 120, according to the counter-measure whose execution is triggered, either the method continues via the execution of steps 102 to 112 but modified so as to implement the counter-measure triggered, or the method stops. For example, the method stops if the counter-measure whose execution has been triggered totally prohibits the generation of the video stream 57 or 18. Conversely, the method continues if, for example, the counter-measure executed consists simply in degrading the video stream 57 or 18 or the coordinates of the point 58.

Typically, the analyzer 53 is capable of triggering the execution of several of these counter-measures, either simultaneously, or alternately.

In the case where various counter-measures can be executed during step 120, each of these counter-measures is for example associated with a respective predetermined threshold. These various thresholds are ranked in ascending order. In this case, the instruction transmitted by the analyzer 53 to the module in charge of triggering the counter-measure can comprise the identifier of the highest threshold crossed. In response, during step 120, only the counter-measure or counter-measures associated with this predetermined threshold are executed. This makes it possible to execute only the counter-measures corresponding to the global score calculated and therefore to execute a response proportionate to the abnormal behavior detected.

Variants of the System 2:

The device 12 can be replaced with a screen and a projector which projects the images of the video stream read onto this screen. Preferably, the surface of the screen will then be a hemisphere or a sphere or an annulus surrounding the user.

What has been described applies to domains other than stereoscopic display. In these cases, the composer constructs for example a single image fraction rather than two as described previously. For example, this applies to the case where the screen surrounds the user as in the case of a spherical or hemispherical screen. This applies also to the case of a flat screen, whose dimensions are such that the user cannot have global vision of the totality of its surface.

The set 32 or the display device 12 can be integrated inside the terminal 8. This will for example be the case if the terminal 8 is a tablet or a smartphone. The set 32 can also be mechanically independent of the device 12 and of the terminal 8.

The set 32 can comprise in addition or instead electronic sensors other than those previously described. For example, the set 32 can comprise one or more of the following electronic sensors:

One or more sensors which measure the movement of the user's head such as a gyroscope or a magnetometer fixed on the virtual reality headset. The position of the head can also be measured on the basis of images filmed by a stationary camera which is mechanically independent of the virtual reality headset. In the latter case, the headset can comprise particular features or LEDs which help to determine the position of the head on the basis of the images filmed by this camera.

One or more sensors which measure the movements of the user's eyes or pupils. Here again, this sensor can comprise a camera which films the user's eyes and on the basis of the filmed images deduces therefrom the movement of the eyes or pupils.

One or more sensors which measure the movements of some other part of the user's body, such as their hands, their lips, their chest, their feet or other. Such a sensor can comprise to this effect a camera which films the movement of the user and a unit for analyzing the filmed images which determines the movement carried out by the body part filmed by this camera. The sensor can also be a joystick, an instrumented glove, an instrumented treadmill, a button or the like.

A sensor which measures the user's neural activity, such as an electro-encephalograph. In this case, the behavior of the user that causes the video stream 18 to vary is not necessarily a position or a movement of the user. Indeed, this type of sensor is also sensitive to the user's emotional or mental state. It is also possible to deduce a position or a movement of the user from the measurements of such a sensor.

A sensor of sounds or of speech uttered by the user during the reading of the video stream. In this case also, the behavior of the user that causes the video stream 18 to vary is not a position or a movement. Typically, the sensor of sounds or of speech comprises, or is associated with, a voice recognition device which transforms the sounds or the speech logged into commands executable by the composer 52 to generate the stream 18.

The DRM agent 50 can be implemented in a hardware form such as a security coprocessor or a processor of a chip card.

The system 2 can be embodied in such a way as to comply with standards other than those cited previously. For particular applications, neither is it compulsory that the system 2 be compatible with existing standards. For example, in a variant, the video stream is compressed image by image so that each group of images contains just a single image. In another variant, the video stream is compressed into a single block, this amounting to having a single group of images comprising all the images of the video. Finally, in another alternative, the group of images is not a smaller closed group of images.

Variants of the Reading Method:

As a variant, the video stream 4 is only compressed and not encrypted. In this case, it is still possible to execute the counter-measures described hereinabove to degrade the video stream 57 or interrupt its decompression. Such an embodiment is still of interest since it makes it more difficult, or indeed impossible, to reconstruct a complete copy of the video stream 57 on the basis of various proofs of the video stream 18 that are composed by the composer 51.

In another embodiment, the counter-measures are not associated with the thresholds and, for example, the determination of the counter-measure or counter-measures triggered is random.

There exist other counter-measures whose execution can be triggered as described previously. For example, as described in patent application WO2008/134014A2, it is possible to regularly modify a parameter of diversification of the video streams 18 or 57 as counter-measure.

The methods described here can be implemented on all the images of the video or for only part of these images. For example, the methods described here are implemented during certain time intervals and deactivated during other time intervals.

Variants of the Method for Detecting Abnormal Behaviors:

The analyzer 53 can be implemented elsewhere than in the terminal 8. For example, it can also be implemented inside the server 38 or in some other remote server. Accordingly, the data collected by the terminal 8 are transmitted to the server 38. Thereafter, the server 38 executes steps 132 to 134 to detect an abnormal behavior of the user of the terminal 8, the decision step 136 and, if relevant, the counter-measure execution step 120. If relevant, the execution of the counter-measure is triggered by dispatching an instruction to the generator 6 and/or to the terminal 8. This instruction is dispatched to the generator 6 when it is the latter that executes the counter-measure. For example, in response to this instruction, the generator 6 transmits an EMM ("Entitlement Management Message") message to the terminal 8 which removes or restricts this terminal's access rights to the video stream 4. For example, the generator 6 ceases transmitting to the terminal 8 the access rights to the video stream 4 or the video stream 4 itself, thereby making it impossible for this terminal 8 to obtain the plaintext video stream 57.

In another variant, the various functionalities of the analyzer 53 can also be implemented partly in the server 38 and partly in the terminal 8. For example, only the initial-detection techniques are implemented in the terminal 8. The classification and consolidation techniques are only implemented in the server 38.

The server 38 can also be implemented in the terminal 8.

In another variant, the analyzer 53 implements just a single or only a few of the previously described detection techniques. In particular, in a simplified embodiment, the consolidation or classification techniques are omitted. In the case where no consolidation technique is implemented, the server 38 can be omitted and, during step 130, the data collected by the terminals 34 are not transmitted. Conversely, in a different embodiment, only one or more consolidation techniques are implemented.

The person skilled in the art will be able, inspired by the numerous examples described hereinabove of detection techniques, to develop other detection techniques. For example, the same characteristic data as those described in the case of the acceleration of the movement can also be constructed to characterize physical properties of the speed of movement of the user. Accordingly, the analyzer 53 uses acquired measurements of the speed of the movement instead of the acquired measurements of the acceleration of this movement. Thereafter, the analyzer 53 implements initial-detection techniques similar to those described hereinabove in the case of the acceleration to detect an abnormal behavior on the basis of the data characteristic of the speed.

As already illustrated in the exemplary embodiments described hereinabove, the comparison of the characteristic datum consists in testing one of the following inequalities $f(x)<S_x$ or $f(x)>S_x$ or $f(x)\leq S_x$ or $f(x)\geq S_x$, where:

f is a function which returns a value which depends on the characteristic datum x, and $S_x$ is a predetermined threshold.

In the simplest case, the function f is the identity function. However, as shown in the previous examples, the function f can be a more complex function such as a classifier or a multivariate function.

In another variant, it is the characteristic data rather than the collected data which are transmitted to the server 38. The functioning of the server 38 and the flow of the methods previously described must then be adapted to take account of the fact that it is characteristic data rather than collected data which are received.

In a simplified variant, the construction of a characteristic datum on the basis of the collected measurements consists simply in assigning the measurement collected as value of this characteristic datum. This is possible if the characteristic datum is identical to the collected measurement. For example, if the collected measurement is already at least partly processed by the sensor itself, then the value of the characteristic datum is equal, without other additional processing for its construction, to this measurement.

In another embodiment, the analyzer 53 undertakes step 136 only after a predetermined number of implementations of step 134, or after elapsing of a predetermined duration since the previous implementation of step 136 or since the start of the reading of the video stream 4.

The invention claimed is:

1. A method comprising reading a video stream at a first terminal, wherein reading said video stream at said first terminal comprises, at said first terminal:
   collecting at least one measurement representative of a behavior of a user of the first terminal during the reading of the video stream,
   constructing, on the basis of said at least one collected measurement, at least one datum characteristic of the behavior of the user,
   decompressing the video stream to obtain a first baseband video stream that is independent of said at least one collected measurement,
   composing, on the basis of said at least one constructed characteristic datum and of the first baseband video stream, a second baseband video stream that varies as a function of said at least one constructed characteristic datum,
   comparing said at least one characteristic datum with a set of predetermined thresholds, each of which, when crossed, characterizes an abnormal behavior of the user,
   detecting that at least one of said predetermined thresholds has been crossed,
   in response to having detected that said predetermined threshold has been crossed, signaling an abnormal behavior, and
   executing a counter-measure that makes it more difficult or impossible to access a set of information items contained in the first baseband video stream on the basis of various different proofs of the second baseband video stream composed by the first terminal,
   wherein executing the counter-measure is triggered automatically only in response to the signaling the abnormal behavior,
   said method further comprising:
   at each of several second video terminals that are distinct from said first terminal, reading said video stream,
   during each of these readings, when a characteristic datum constructed by the second terminal and a first image of the first baseband video stream are used to compose the second baseband video stream, associating said characteristic datum with an identifier of said first image,
   transmitting the characteristic datum and the identifier to a data-aggregation server, and
   at the data-aggregation server, constructing, on the basis of the transmitted characteristic data associated with the identifier of said first image, statistical data representative of the behaviors of the users of the second terminals at the instants at which the first image was processed by composers of the second terminals,
   wherein comparing said at least one characteristic datum with a set of predetermined thresholds comprises:
   comparing a disparity with a first predetermined threshold, said disparity being a disparity between the statistical data constructed by said data-aggregation server for said first image and said characteristic datum or data constructed by said first terminal and used by said first terminal in combination with said first image to compose said second baseband video stream.

2. The method as claimed in claim 1,
   wherein said statistical data comprises a mapping that associates each pixel of said first image with a number that represents the probability that a user gazes towards said pixel,
   wherein at least one characteristic datum constructed by the first terminal is the position of a point of interest in the first image toward which the user of the first terminal gazes as the composer processes said first image, and
   wherein the disparity is a distance calculated based on the point-of-interest's position within the first image and the position or positions of those pixels that, according to said mapping, are associated with the highest probabilities of being gazed at by said user.

3. The method as claimed in claim 1, wherein said at least one measurement representative of a behavior of the user comprises a measurement representative of a position or of a movement of the user.

4. The method of claim 1, wherein, before decompressing the video stream, the first terminal decrypts the video stream with the aid of a secret key.

5. A manufacture comprising a non-transitory information-recording medium having encoded thereon instructions for causing an electronic microprocessor to execute the reading method in accordance with claim 1.

6. A method comprising reading a video stream at a first terminal, wherein reading said video stream at said first terminal comprises, at said first terminal:
   collecting at least one measurement representative of a behavior of a user of the first terminal during the reading of the video stream,
   constructing, on the basis of said at least one collected measurement, at least one datum characteristic of the behavior of the user, said behavior including the speed or the acceleration of a movement of the user of the first terminal, decompressing the video stream to obtain a first baseband video stream that is independent of said at least one collected measurement, and composing on the basis of said at least one constructed characteristic datum and of the first baseband video stream, a second baseband video stream that varies as a function of said at least one constructed characteristic datum, wherein the method further comprises:

comparing said at least one characteristic datum with a set of predetermined thresholds, each of which, when crossed, characterizes an abnormal behavior of the user, wherein comparing said at least one characteristic datum with a set of predetermined thresholds comprises comparing the speed or the acceleration with a predetermined threshold of said set of thresholds, the threshold being calibrated to discriminate between a movement of a human being and a movement of an automaton, upon detecting that at least one predetermined threshold has been crossed, signaling an abnormal behavior, and executing a counter-measure that makes it more difficult or impossible to access a set of information items contained in the first baseband video stream on the basis of various proofs of the second baseband video stream composed by the first terminal, the execution step being triggered automatically only in response to the signaling of the abnormal behavior.

7. A manufacture comprising a non-transitory information-recording medium having encoded thereon instructions for causing an electronic microprocessor to execute the reading method in accordance with claim 6.

8. The method of claim 6, wherein, before decompressing the video stream, the first terminal decrypts the video stream with the aid of a secret key.

9. A method comprising reading a video stream at a first terminal, wherein reading said video stream at said first terminal comprises, at said first terminal:

collecting at least one measurement representative of a behavior of a user of the first terminal during the reading of the video stream, constructing, on the basis of said at least one collected measurement, at least one datum characteristic of the behavior of the user, decompressing the video stream to obtain a first baseband video stream that is independent of said at least one collected measurement, composing on the basis of said at least one constructed characteristic datum and of the first baseband video stream, a second baseband video stream that varies as a function of said at least one constructed characteristic datum, comparing said at least one characteristic datum with a set of predetermined thresholds, each of which, when crossed, characterizes an abnormal behavior of the user, detecting that at least one predetermined threshold has been crossed, in response to having detected that said predetermined threshold has been crossed, signaling an abnormal behavior, executing a counter-measure that makes it more difficult or impossible to access a set of information items contained in the first baseband video stream on the basis of various different proofs of the second baseband video stream composed by the first terminal, wherein executing the counter-measure is triggered automatically only in response to the signaling of the abnormal behavior, and executing a supervised learning phase, wherein, during said supervised learning phase, a classifier establishes, for at least one learned characteristic datum, the value of a third threshold on the basis of first and second prerecorded suites of characteristic data, the data characteristic of the first suite having been constructed when the measurements collected were generated by a human being and the data characteristic of the second suite having been constructed when the measurements collected were generated with the aid of an automaton, wherein said at least one characteristic datum constructed by the first terminal is the learned characteristic datum and wherein comparing said at least one characteristic datum with a set of predetermined thresholds comprises causing the classifier to compare the value of the learned characteristic datum with the third predetermined threshold.

10. The method as claimed in claim 9, wherein the method further comprises calculating a global score as a function of the number of times that the thresholds from said set of predetermined thresholds have been crossed inside a predetermined time window and wherein the execution of the counter-measure is triggered only if the global score crosses a fourth predetermined threshold.

11. A manufacture comprising a non-transitory information-recording medium having encoded thereon instructions for causing an electronic microprocessor to execute the reading method in accordance with claim 9.

12. The method of claim 9, wherein, before decompressing the video stream, the first terminal decrypts the video stream with the aid of a secret key.

13. A set of terminals for reading a video stream, said set of terminals comprising a first terminal and second terminals, wherein each of said terminals is configured to:

to collect at least one measurement representative of a behavior of a user of the terminal during the reading of the video stream and construct, on the basis of said at least one collected measurement, at least one datum characteristic of the behavior of the user, to decompress the video stream to obtain a first baseband video stream that is independent of said at least one collected measurement, and to compose, on the basis of said at least one constructed characteristic datum and of the first baseband video stream, a second baseband video stream that varies as a function of said at least one constructed characteristic datum, wherein the first terminal is further configured to compare said at least one characteristic datum with a set of predetermined thresholds, each of which, when it is crossed, characterizes an abnormal behavior of the user, and then to signal an abnormal behavior upon detecting that at least one predetermined part of these thresholds has been crossed and in response to the signaling of an abnormal behavior, to automatically trigger the execution of a counter-measure that makes it more difficult or impossible to access the set of information items contained in the first baseband video stream on the basis of various proofs of the second baseband video stream composed by the first terminal, wherein each of said second terminals is configured:

to read said video stream before said first terminal has read said video stream, wherein, while reading said video stream, when a characteristic datum constructed by said second terminal and a first image of said first baseband video stream are used to compose said second baseband video stream, said characteristic datum is associated with an identifier of said first image, and said characteristic datum and said identifier associated therewith of said first image are transmitted to a data-aggregation server, and wherein said first terminal is configured:

to obtain statistical data from said data-aggregation server, said statistical data being representative of said behaviors of said users of said second terminals at said instants at which said first image was processed by composers of said second terminals, said data-aggregation server having constructed said statistical data based at least in part on said transmitted characteristic data associated with said identifier of said first image, and to compare a first predetermined threshold with a disparity, said disparity being a disparity between said statistical data constructed by said data-aggregation server for said first image and said characteristic datum or data constructed by said first terminal and used by said first terminal, in combination with said first image, to compose said second baseband video stream.

\* \* \* \* \*